US008635295B2

(12) United States Patent
Mulder (10) Patent No.: US 8,635,295 B2
(45) Date of Patent: Jan. 21, 2014

(54) METHODS AND SYSTEMS FOR MONITORING DOCUMENTS EXCHANGED OVER EMAIL APPLICATIONS

(75) Inventor: Samuel Peter Matthew Mulder, London (GB)

(73) Assignee: Workshare Technology, Inc., San Francisco, CA (US)

( * ) Notice: Subject to any disclaimer, the term of this patent is extended or adjusted under 35 U.S.C. 154(b) by 178 days.

(21) Appl. No.: 13/306,782

(22) Filed: Nov. 29, 2011

(65) Prior Publication Data

US 2012/0136952 A1 May 31, 2012

Related U.S. Application Data

(60) Provisional application No. 61/417,855, filed on Nov. 29, 2010, provisional application No. 61/417,853, filed on Nov. 29, 2010, provisional application No. 61/417,858, filed on Nov. 29, 2010, provisional application No. 61/417,869, filed on Nov. 29, 2010.

(51) Int. Cl.
*G06F 15/16* (2006.01)

(52) U.S. Cl.
USPC ........... 709/206; 715/200; 715/251; 715/254; 715/273; 715/277; 707/737; 707/741; 707/748; 707/749

(58) Field of Classification Search
USPC ........................................... 709/206
See application file for complete search history.

(56) References Cited

U.S. PATENT DOCUMENTS

| 5,619,649 | A | 4/1997 | Kovnat et al. |
|---|---|---|---|
| 6,505,237 | B2 | 1/2003 | Beyda et al. |
| 6,560,620 | B1 | 5/2003 | Ching |
| 6,662,212 | B1 | 12/2003 | Chandhok et al. |
| 7,113,615 | B2 | 9/2006 | Rhoads et al. |
| 8,196,030 | B1 * | 6/2012 | Wang et al. .................... 715/200 |
| 8,201,254 | B1 * | 6/2012 | Wilhelm et al. ................ 726/24 |
| 8,233,723 | B2 | 7/2012 | Sundaresan |
| 8,286,085 | B1 | 10/2012 | Denise |
| 2003/0115273 | A1 | 6/2003 | Delia et al. |
| 2003/0233419 | A1 | 12/2003 | Beringer |
| 2004/0186851 | A1 * | 9/2004 | Jhingan et al. ............. 707/104.1 |
| 2004/0261016 | A1 | 12/2004 | Glass et al. |

(Continued)

OTHER PUBLICATIONS

Non-Final Office Action mailed Dec. 6, 2012 in co-pending U.S. Appl. No. 13/306,798, filed Nov. 29, 2011.

(Continued)

*Primary Examiner* — Tauqir Hussain
(74) *Attorney, Agent, or Firm* — Ted Sabety, Esq.; Sabety + Associates PLLC (57) ABSTRACT

Disclosed herein are methods and systems for monitoring and detecting changes in files attached to incoming emails. In one embodiment, if files are attached to an outgoing email, the change service uniquely tags each of the attached files and optionally stores local or remote copies of the tagged files. Additionally, in embodiments, the change service monitors and intercepts incoming emails. If files are attached to an incoming email, the change service identifies whether the files are tagged in a manner unique to the compare service. The change service then matches uniquely tagged files in the incoming email to corresponding files previously tagged by the change service. The change service then compares the two documents and generates reports that identify changes in the received document in relation to the transmitted document. Further, in embodiments, the change service provides visual indicators of the changes within the email application.

24 Claims, 8 Drawing Sheets

(56) References Cited

U.S. PATENT DOCUMENTS

| | | |
|---|---|---|
| 2006/0190493 A1 | 8/2006 | Kawai et al. |
| 2007/0011211 A1 | 1/2007 | Reeves et al. |
| 2007/0027830 A1 | 2/2007 | Simons et al. |
| 2007/0100991 A1* | 5/2007 | Daniels et al. ............... 709/224 |
| 2007/0112930 A1 | 5/2007 | Foo et al. |
| 2009/0030997 A1 | 1/2009 | Malik |
| 2009/0083384 A1 | 3/2009 | Bhogal et al. |
| 2009/0177754 A1 | 7/2009 | Brezina et al. |
| 2009/0216843 A1* | 8/2009 | Willner et al. ............... 709/206 |
| 2009/0222450 A1 | 9/2009 | Zigelman |
| 2009/0234863 A1 | 9/2009 | Evans |
| 2010/0011077 A1 | 1/2010 | Shkolnikov et al. |
| 2010/0017404 A1 | 1/2010 | Banerjee et al. |
| 2010/0174761 A1 | 7/2010 | Longobardi et al. |
| 2011/0029625 A1* | 2/2011 | Cheng et al. ............... 709/206 |
| 2011/0141521 A1 | 6/2011 | Qiao |
| 2011/0145229 A1 | 6/2011 | Vailaya et al. |
| 2012/0011361 A1* | 1/2012 | Guerrero et al. ............... 713/168 |
| 2012/0110092 A1* | 5/2012 | Keohane et al. ............... 709/206 |
| 2012/0265817 A1* | 10/2012 | Vidalenc et al. ............... 709/204 |

OTHER PUBLICATIONS

Co-pending U.S. Appl. No. 13/306,765, filed Nov. 29, 2011.
Co-pending U.S. Appl. No. 13/306,798, filed Nov. 29, 2011.
Co-pending U.S. Appl. No. 13/306,819, filed Nov. 29, 2011.
Final Office Action mailed Aug. 16, 2013 in co-pending U.S. Appl. No. 13/306,798 of Glover, R.W., filed Nov. 29, 2011.
Non-Final Office Action mailed May 17, 2013 in co-pending U.S. Appl. No. 13/306,765 by Mulder, S. P. M, filed Nov. 29, 2011.
Non-Final Office Action mailed Aug. 13, 2013 in co-pending U.S. Appl. No. 13/306,819 by Glover, R.W., filed Nov. 29, 2011.

* cited by examiner

METHODS AND SYSTEMS FOR MONITORING DOCUMENTS EXCHANGED OVER EMAIL APPLICATIONS

CROSS REFERENCE TO RELATED APPLICATIONS

This application claims the benefit of U.S. Provisional Application No. 61/417,855 entitled METHODS AND SYSTEMS FOR MONITORING DOCUMENTS EXCHANGED OVER EMAIL APPLICATIONS, filed Nov. 29, 2010, and is hereby incorporated by reference in its entirety.

This patent application is related to the technologies described in the following patents and applications, all of which are incorporated herein in their entireties:

U.S. Provisional Application No. 61/417,853, entitled METHODS AND SYSTEMS FOR MONITORING DOCUMENTS EXCHANGED OVER EMAIL APPLICATIONS, filed Nov. 29, 2010; and U.S. Provisional Application No. 61/417,858, entitled SYSTEM AND METHOD FOR PRESENTING COMPARISONS OF ELECTRONIC DOCUMENTS, filed Nov. 29, 2010; and U.S. Provisional Application No. 61/417,869, entitled SYSTEM AND METHOD FOR PROVIDING A COMMON FRAMEWORK FOR REVIEWING COMPARISONS OF ELECTRONIC DOCUMENTS, filed Nov. 29, 2010.

FIELD OF INVENTION

The present invention generally relates to the field of digital document review. More particularly, the present invention relates to methods and systems for monitoring documents exchanged over email applications.

BACKGROUND OF THE INVENTION

Document collaboration is a way by which multiple document editors can make edits to a central copy of a document. The edits made by each contributing author is collectively captured. In some instances, a primary editor may then accept or reject edits or content contributed by the other authors. There is a variety of document collaboration software in the market that enables the functionality described above. However, as indicated, such document collaboration software is geared toward multiple authors working together. Often, a primary author has to be designated and contributing authors have to be identified.

In a more day-to-day occurrence, users create documents (e.g., Word® documents, PowerPoint® slide decks, etc.) that they distribute to one or more users for review. Often times, a recipient of the document may have contributions to the documents in the form of one or more edits. The receiving user may then return an edited form of the document back to the original user. Unless the original user installs document collaboration software, hassles with designating authors, and sends documents through the document collaboration software, the user will not be able to track changes made to the document. Such a process would be time consuming, expensive, and would also require the user to go completely out of his normal routine to get the process established. For an average user who sends out dozens of documents a day and returns quite a few back with edits, the document collaboration software is just not an option.

In the normal scenario, when a user receives an edited version of a document from another user (that the user originally sent to the other user), the user may or may not know whether the document was actually edited by the other user. Also, even if the document was edited, the user may have no way of realizing what the changes were, and so would not be able to accept or ignore (or at the very least, acknowledge) the changes.

Overall, the examples herein of some prior or related systems and their associated limitations are intended to be illustrative and not exclusive. Other limitations of existing or prior systems will become apparent to those of skill in the art upon reading the following Detailed Description.

SUMMARY OF THE DESCRIPTION

At least one embodiment of this invention pertains to a compare service for monitoring and detecting changes in files attached to an incoming email. In one embodiment, the change service monitors emails that a user intends to transmit using an email application. If files are attached to an outgoing email, the change service uniquely tags each of the attached files and optionally stores local or remote copies of the tagged files. Additionally, in embodiments, the change service monitors and intercepts incoming emails directed to the user. If files are attached to an incoming email, the change service identifies whether the files are tagged in a manner unique to the compare service. The change service then matches any such uniquely tagged files in the incoming email to corresponding files previously tagged by the change service. In embodiments, the change service compares the two documents and generates reports that identify changes in the received document in relation to the transmitted document.

Further, in embodiments, the change service provides visual indicators of the changes within the email application. For example, the change service may include a change indicator field within the email application (in addition to, for example, the conventional fields such as subject indicator, sender indicator, received time indicator, etc.) indicating that the received document includes at least one change. In another example, the change service may include a visual description of the amount of changes (e.g., in the form of a percentage difference in contents of the files) in the received file in relation to the transmitted file.

Other advantages and features will become apparent from the following description and claims. It should be understood that the description and specific examples are intended for purposes of illustration only and not intended to limit the scope of the present disclosure.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

The headings provided herein are for convenience only and do not necessarily affect the scope or meaning of the claimed invention.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION OF THE INVENTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1A:
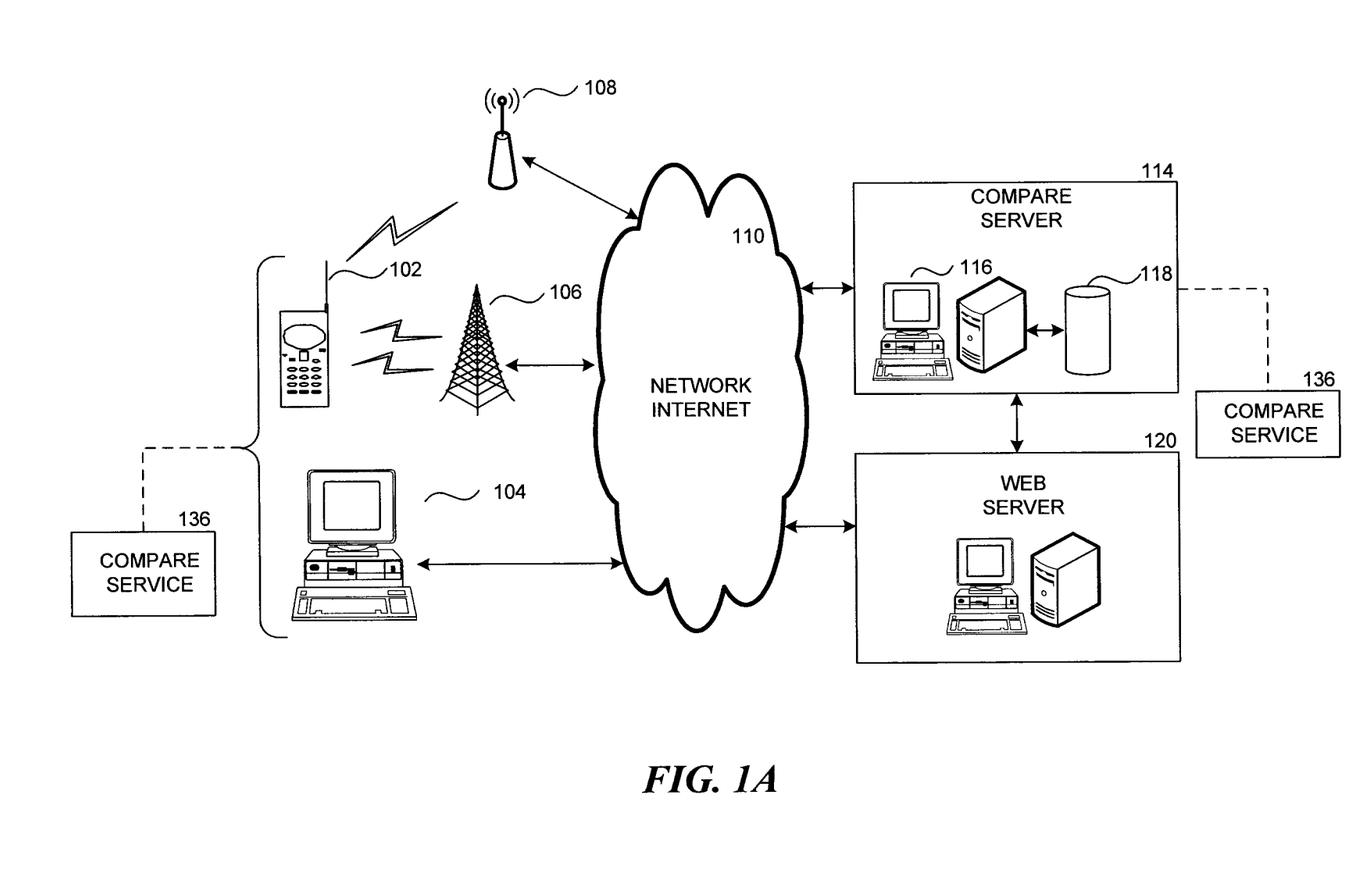
FIG. 1A and the following discussion provide a brief, general description of a representative environment in which the invention can be implemented.

FIG. 1A and the following discussion provide a brief, general description of a representative environment in which the invention can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nano-technology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave (s), a sound wave, etc.) over a period of time. In some implementations, the data may be provided on any analog or digital network (packet switched, circuit switched, or other scheme).

As shown in FIG. 1A, a user may use a personal computing device (e.g., a mobile computing device 104, a personal computer 102, etc.) to execute functionalities for the techniques described herein. The user may also use the personal computing device to communicate with a network. The term "mobile computing device," as used herein, may be a laptop, a netbook, a personal digital assistant (PDA), a smart phone (e.g., a Blackberry®, an Iphone®, etc.), a portable media player (e.g., an IPod Touch®), or any other device having communication capability to connect to the network. In one example, the mobile computing device 104 connects to the network using one or more cellular transceivers or base station antennas (not shown in FIG. 1), access points, terminal adapters, routers or modems 106 (in IP-based telecommunications implementations), or combinations of the foregoing (in converged network embodiments).

In some instances, the network 110 is the Internet, allowing the personal computing device to access functionalities offered through, for example, the compare server 120 or various web servers. In some instances, the network is a local network maintained by a private entity or a wide area public network, or a combination of any of the above types of networks. In some instances, especially where the mobile computing device 104 is used to access web content through the network 110 (e.g., when a 3G or an LTE service of the phone 102 is used to connect to the network 110), the network 110 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

As shown in FIG. 1A, in some instances, the personal computing device may have a compare service 136 installed locally. In such instances, and as will be explained in detail below, the compare service 136 locally monitors one or more email applications (e.g., Microsoft Outlook®) to detect attachments in incoming or outgoing emails. In some instances, the compare service 136 has an associated storage space in the personal computing device 102 or 104 to store local copies of documents and to be able to tag documents using unique tagging sequences. In some instances, while the compare service 136 may run on the personal computing device, it may use data storage capabilities of a remote server (e.g., compare server 114) to perform the various functionalities described herein. In embodiments, the compare service is installed as a protect agent at egress points (e.g., the email application or the email server) with local lightweight or complete database structures. Detailed explanation of such egress points, protect agents, and local lightweight/complete databases is provided in detail in U.S. application Ser. No. 12/209,096, filed Sep. 11, 2008, entitled "METHODS AND SYSTEMS TO IMPLEMENT FINGERPRINT LOOKUPS ACROSS REMOTE AGENTS," and further in U.S. application Ser. No. 12/209,082, filed Sep. 11, 2008, entitled "METHODS AND SYSTEMS FOR PROTECT AGENTS USING DISTRIBUTED LIGHTWEIGHT FINGERPRINTS," which are both incorporated herein in their entireties.

In some instances, the compare service 136 is configured to run remotely on a compare server 120. In one example, the compare service is run akin to a web or internet service in conjunction with a web server 122. As explained above, a user may use a personal computing device to connect to the compare server 114 using the network (e.g., a local office network, the Internet, etc.). In such an embodiment, the compare server 114 may connect to an email server associated with the personal computing devices 102, 104 to monitor incoming or outgoing email applications, and to perform other functions (such as, e.g., tagging functions, document compare functions, reporting functions, etc.) remotely on the compare server 114. In one example, the compare service may operate both locally at the site of the personal computing device and remotely in conjunction with, for example, an email server. In embodiments, the web server 116 may function as the email server associated with email applications included in the personal computing devices. In such examples, the remote service may directly communicate with the email server to intercept and monitor incoming or outgoing emails from a user and perform corresponding tagging, comparing, and reporting functionalities. The local service may in turn operate in conjunction with the remote service to receive updates regarding changes in specific file attachments and perform operations to report the changes to the user.

Other examples of installing the compare service 136 either locally at the site of the personal computing device or as a remote functionality, as may be contemplated by a person of ordinary skill in the art, may be substituted for the functionalities described herein.

In embodiments, the compare service 136 maybe customized by use of a "compare service" control panel within an email application used by a user on the personal computing device 102, 104. Such an email application may include a POP3 or other push type email applications (such as, for example, Microsoft Outlook®, etc.) or may be web based email applications (such as, for example, Yahoo® email, etc.). In either case, the user may be presented with a set of control options to enable or disable features relating to the compare service. In one example, the user may be able to selectively enable or disable the compare service 136 functionalities. In one example, the user may be able to enable the compare service, but only for certain types of documents (e.g., only for word based documents, but not for image files or other document types, etc.). In one example, the user may be able to enable the compare service, but customize the type of reporting indicators (e.g., report only that a change is present in a document returned to the user, or report that a change is present and also report a percentage change in the received document in relation to the sent document, etc.). In one example, the user may be able to customize the type of reporting displays (e.g., receive the returned document and, in addition, receive a redline document identifying changes in received document in redline format; receive the returned document, and in addition, receive the redline version as embedded text within the email, etc.). Additional functionalities, as may be contemplated by a user of ordinary skill in the art, may also be utilized herein. The following sections describe the various functionalities of the compare service 136 in greater detail.

Figure 1B:
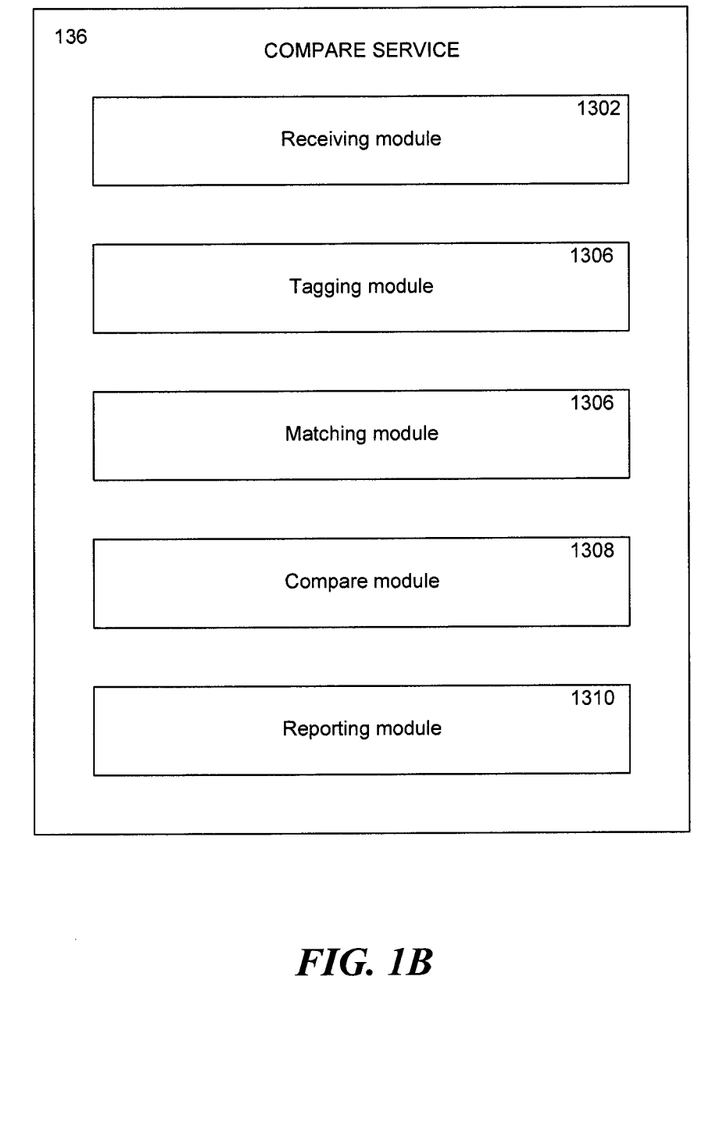
FIG. 1B is a block diagram illustrating an exemplary architecture of a compare service.

FIG. 1B is a block diagram illustrating an exemplary architecture of a compare service 136. In the illustrated embodiment, the compare service includes a plurality of functional modules, where each of the functional modules is configured to perform a unique function of the compare service. The various functional modules can be implemented by using programmable circuitry programmed by software and/or firmware, or by using special-purpose hardwired circuitry, or by using a combination of such embodiments. In some instances, the functional modules are implemented as units in a processor of the deals server.

The functional modules include a receiving module 1302. In embodiments, the receiving module 1302 is configured to operate, for example, in tandem with an email server or directly with the email application to monitor incoming and outgoing emails.

In the case of an outgoing email (i.e., an email a user intends to transmit to another user using the email application), the reporting module 1302 first determines whether the email includes one or more attachments. If the receiving module 1302 detects such attachments, the receiving module uniquely tags each of the attachments. Tagging is performed by means of the tagging module 1304 of the compare service 136. In some instances, the reporting module stores (either locally or remotely in the compare server 114) metadata information relating to the document and the document tagging for use in further operations. In some instances, the reporting module 1302 may further establish an additional copy of the files (i.e., the attachments) and store it in conjunction with the tagging metadata information for use in subsequent comparison operations. By maintaining this additional local copy, the compare service 136 is able to compare a received (changed) version of the document with the original document the user sent out, even if the user makes interim changes to the user's copy of the documents. Additionally, in embodiments, maintaining these additional copies in the remote compare server 114 enables remote operation of the compare service 136.

In the case of an incoming email (i.e., an email intended for the user that is transmitted by another person), the reporting module 1302 intercepts the email and performs one or more checks. For example, the reporting module first verifies whether the incoming email includes one or more attachments. If the reporting module identifies such attachments, the reporting module 1302 then determines whether the files (i.e., the attachments) are tagged in a manner consistent with the tagging performed by the tagging module 1304. If such tagging is identified, the reporting module 1302 then submits the received files (i.e., the attachments) to the matching module 1306.

The matching module 1306 compares the tagging information (or other such metadata) associated with the received files with the tagging information of the files the compare service 136 previously tagged (and in some instances, the files for which the compare service 136 made additional copies for subsequent comparison operations). If the matching module 1306 identifies such matching files, the matching module submits the received files and their "matched" counterparts to the compare module 1308 for comparison operations. The compare module 1308 compares the files to identify changes to the files.

The compare module 1308 may utilize any comparison mechanism, as may be contemplated by a person of ordinary skill in the art, for comparing the received files. As previously indicated, the files may be of any format-type that can be perused and compared by the compare service 136. For example, the files may be textual documents created using word-processing software (e.g., MS Word® documents, Acrobat® documents, etc.), slide decks or presentation files, image files, audio files, video files, etc. In embodiments, the compare module 1308 may compare one or more of the textual information, the multimedia information, the formatting information, the image information, etc. of the two files that are compared. Additionally, the comparison may be performed using comparison techniques discussed in the following patent applications, each of which is incorporated herein in its entirety:

Patent application Ser. No. 10/023,010, filed Dec. 17, 2002, issued as U.S. Pat. No. 7,496,841, issued date of Feb. 24, 2009, entitled "METHOD AND SYSTEM FOR DOCUMENT COLLABORATION";

Patent application Ser. No. 12/177,043, filed Jul. 21, 2008, entitled "METHODS AND SYSTEMS TO FINGERPRINT TEXTUAL INFORMATION USING WORD RUNS";

Patent application Ser. No. 12/275,185, filed Nov. 20, 2008, entitled "METHODS AND SYSTEMS FOR IMAGE FINGERPRINTING";

Patent application Ser. No. 12/621,429, filed Nov. 18, 2009, entitled "METHODS AND SYSTEMS FOR EXACT-DATA MATCH FILTERING";

Patent application Ser. No. 12/844,818, filed Jul. 27, 2010, entitled "METHOD AND SYSTEM FOR PREPARING PRESENTATION SLIDE DECKS".

Additionally, the compare module 1308 may also generate comparison reports for use by the reporting module. In one example, the compare module 1308 may generate a new redline document corresponding to the file contained in the incoming email. The redline document would provide a direct comparison, in redline format, of the file in the incoming email and a corresponding (counterpart) file that was previously transmitted by the user. In one example, the compare module may compute a percentage of difference between the received file and the transmitted file. In one example, the compare module 1308 generates a detailed analysis of the type of changes, in terms of the type of changes. In an illustrate example, detailed report may include the following details: "20% textual changes, 60% image changes, 20% formatting changes."

The reporting module 1310 performs various reporting functionalities of the compare service 136. In embodiments, the reporting module interacts with the email application to provide a visual indicator (in relation to the received email) to indicate that an attachment includes changes (as identified by, for example, the compare module 1308). In embodiments, the reporting module 1310 may display information generated by the compare module 1308 (such as, e.g., difference values indicating percentage difference between received and transmitted files) in one or more formats based on prior control settings established by the user. Exemplary illustrations of such displays are discussed below with reference to FIGS. 2A-2C.

Figure 1C:
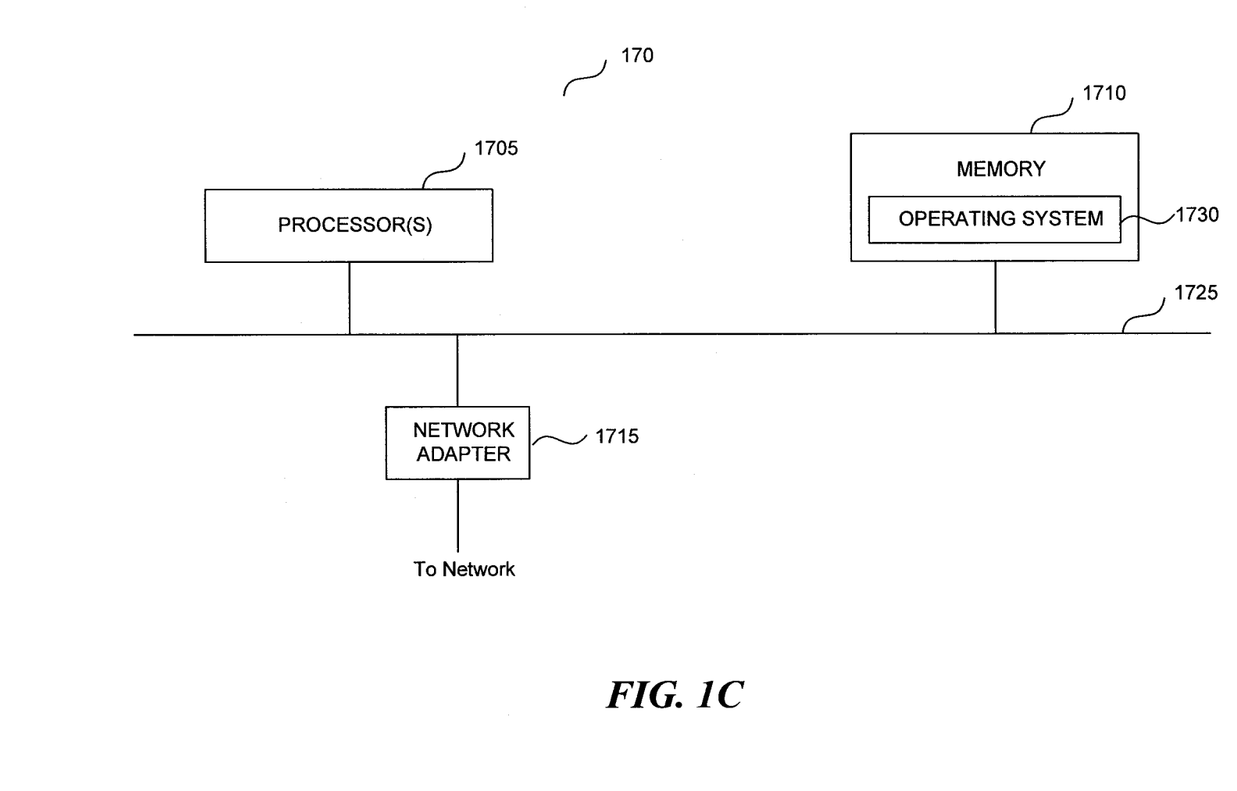
FIG. 1C is a high-level block diagram showing an example of the architecture for a computer system.

FIG. 1C is a high-level block diagram showing an example of the architecture for a computer system 170 that can be utilized to implement a personal computing device (e.g., 102 from FIG. 1A) for running a comparison service, a compare server 114, or a web server (e.g., 120 from FIG. 1A), etc. In FIG. 1C, the computer system 170 includes one or more processors 1705 and memory 1710 connected via an interconnect 1725. The interconnect 1725 is an abstraction that represents any one or more separate physical buses, point to point connections, or both connected by appropriate bridges, adapters, or controllers. The interconnect 1725, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 1705 may include central processing units (CPUs) to control the overall operation of, for example, the host computer. In certain embodiments, the processor(s) 1705 accomplish this by executing software or firmware stored in memory 1710. The processor(s) 1705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1710 is or includes the main memory of the computer system 170. The memory 180 represents any form of random access memory (RAM), read-only memory (ROM), flash memory (as discussed above), or the like, or a combination of such devices. In use, the memory 180 may contain, among other things, a set of machine instructions which, when executed by processor 1705, causes the processor 1705 to perform operations to implement embodiments of the present invention.

Also connected to the processor(s) 1705 through the interconnect 1725 is a network adapter 1715. The network adapter 1715 provides the computer system 170 with the ability to communicate with remote devices, such as the storage clients, and/or other storage servers, and may be, for example, an Ethernet adapter or Fiber Channel adapter.

Figure 2A:
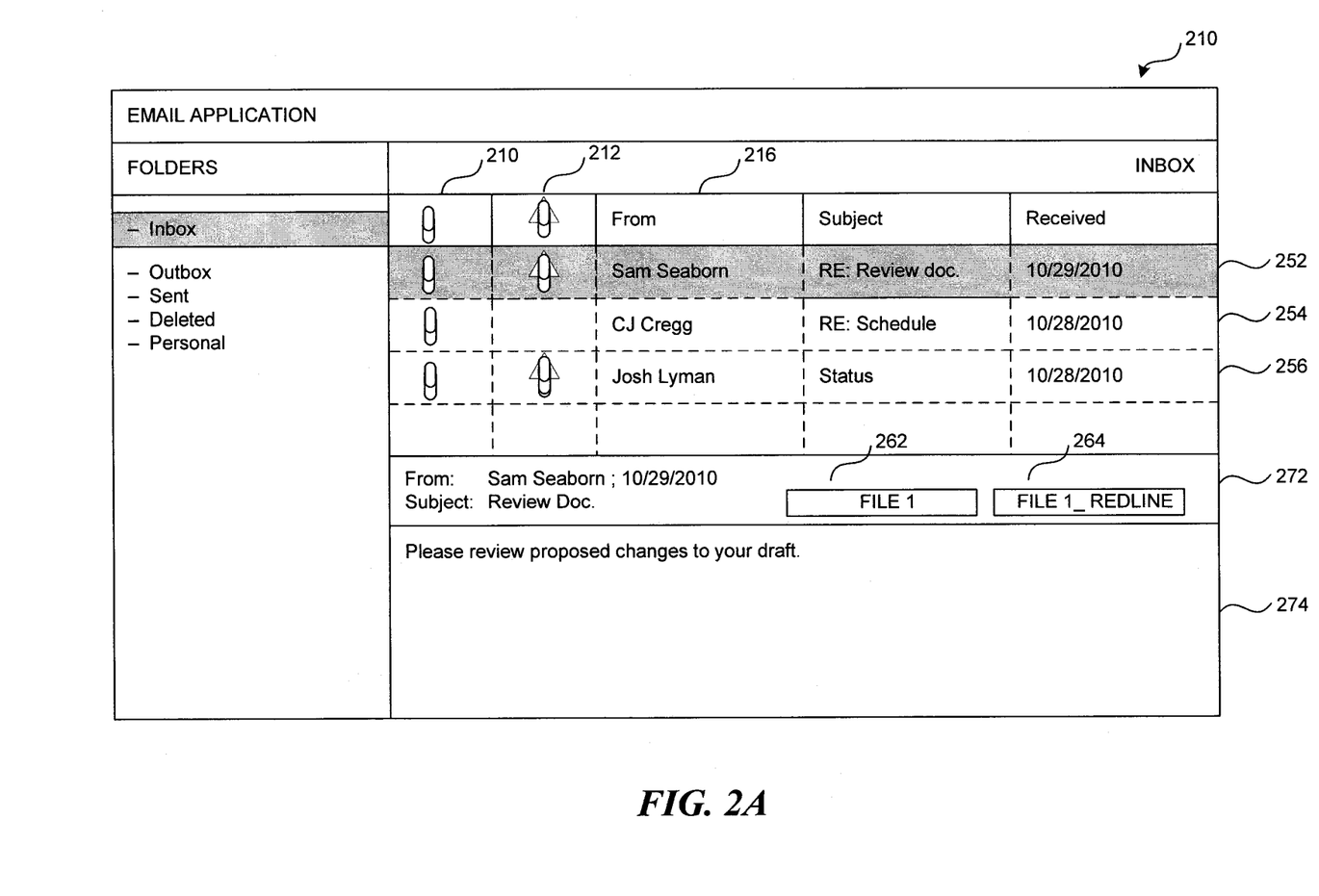
FIGS. 2A-2C provide illustrations of how the change service is implemented within an email application.

FIG. 2A is an illustration of an email application 210 depicting the functionalities of the compare service 136. An example of an "inbox" view of email application 210 is provided. As may be readily perceived by a person of ordinary skill in the art, the "inbox" view (or any folder view within the email application) typically includes fields such as a "From" indicator 216, a "Subject" indicator 218, a "Received date/time" indicator 220, an "Attachment" indicator 210, etc. The attachment indicator 210 typically indicates whether a received email includes, as an attachment, at least one file. In connection with the compare service discussed herein, a new field of the compare service, a "compare" indicator 212, is introduced to the inbox view. This compare indicator 212 represents whether at least one file attached to an email has changed in relation to a previously transmitted file (as determined by the compare service 136).

In the illustration of FIG. 2A, items 252, 254, and 256 are indicators of received emails. Email indicator 252 indicates that at least one file is attached to the email (as indicated in the attachment indicator field 210). Furthermore, in this example, the compare service 136 has determined that at least one of the files has "changed" in relation to a version of the file previously transmitted by the user. Accordingly, the compare indicator filed 212 of email indicator 252 is enabled. In this example, a visual indicator in the form of an icon is displayed in the compare indicator field 212 to provide an alert to the user that there is a change in at least one of the files attached to email 252.

Email indicator 254 also has at least one file attached to it (as indicated by the attachment indicator field 210). However, in this illustration, the file attached to email 254 is either a new file or does not include any changes in relation to files previously transmitted by the user. Accordingly, the compare indicator field 212 is empty (or otherwise disabled) in email indicator 254. Similarly, as illustrated in FIG. 2A, the compare indicator field 212 is enabled for email 256.

Figure 2B:
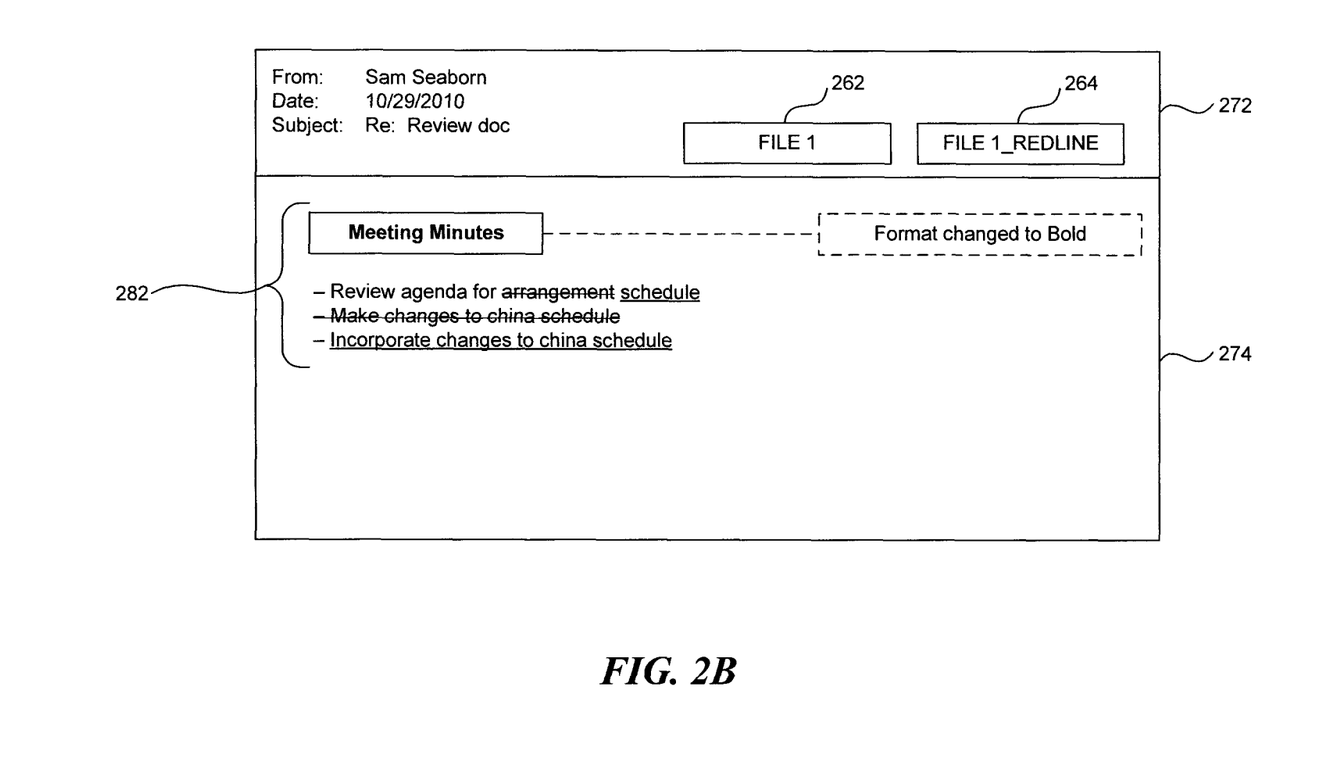

Additionally, in embodiments, the received emails may include redline (i.e., readily perceivable change) information. In one example, as illustrated in the preview pane (located below the incoming email listing), an email that has a "change indicator field" 212 turned on includes the original file attachment 262 (as sent by a sender), and a corresponding redline document (e.g., file1_redline 264). As previously described, this redline document would represent changes to the received file 262 in redline format. In another example, as illustrated in FIG. 2B, the received email may also include the redline changes as an embedded portion of the email. As explained above, the user may change control settings to indicate the types of visual indicators and change summaries the user would like to receive. In the example of FIG. 2B, the user has opted to receive both a redline file 262 and an embedded version of the redline changes in the body 274 of the email. Having this option (i.e., the option of embedded redline changes in the body of the email) would allow a user to easily view and comprehend the changes, even on a smartphone, without having to download or open the file attachments.

Figure 2C:
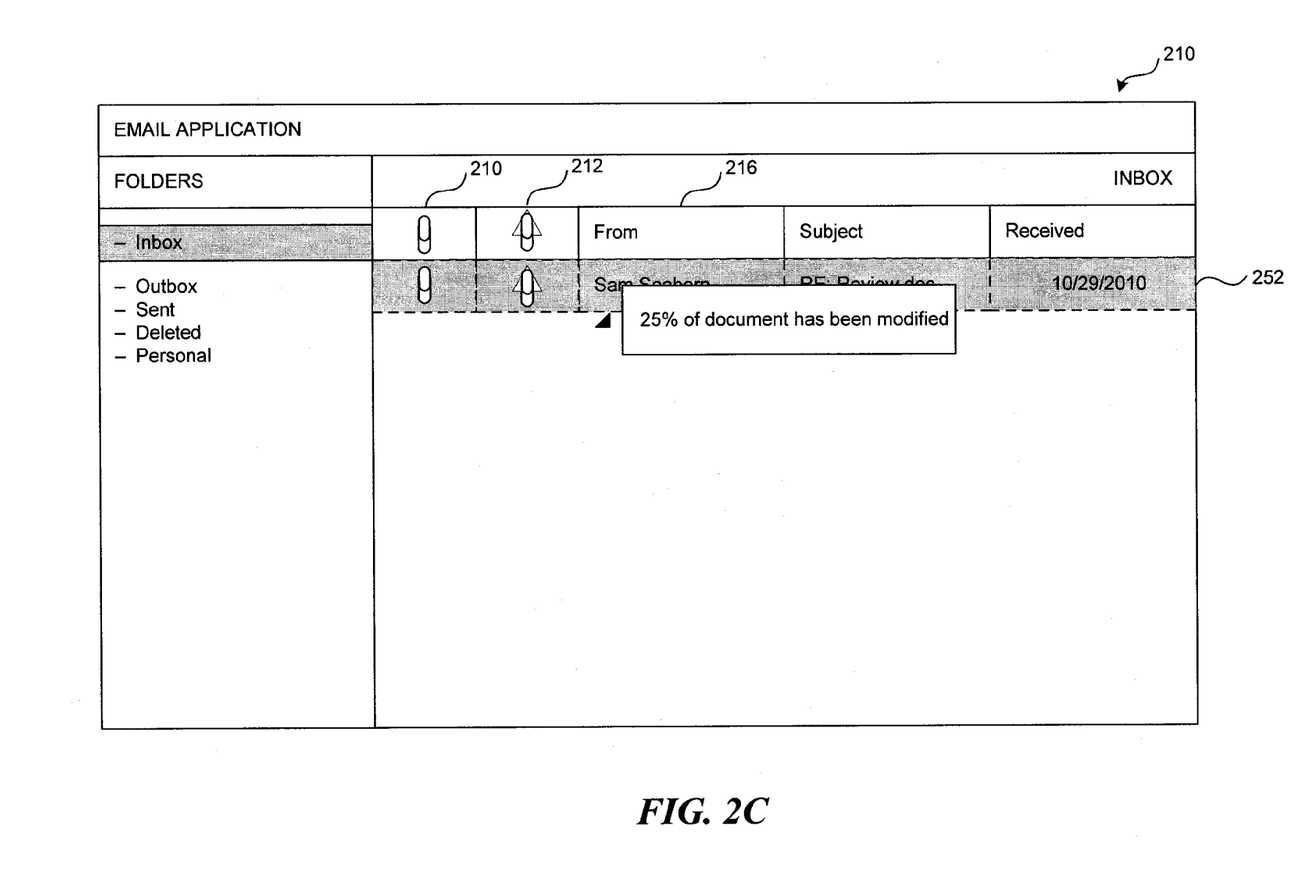

FIG. 2C illustrates an embodiment where the reporting module 1310 provides visual indicators of "difference values." As previously described, in some embodiments, the compare service 136 computes difference values that are indicative of the amount of changes in the received file relative to the transmitted file. This difference value may be reported directly through the email application in several manners. In a first example, as illustrated in FIG. 2C, a percentage value of the changes may be displayed as hovering text over the email indicator 252. In a second example, a bar chart or any other type of pictorial representation may be displayed in the form of a hovering pop-up. In another example, a background color of the change indicator 212 corresponding to email indicator 252 may be changed in relation to the amount of change. For example, in an illustrative embodiment, the background color of change indicator 212 may be red if there is more than 75% change in the received file, orange if there is between 50% and 75% change in the received file, green if there is between 25% and 50% change in the received file, etc.

Figure 3A:
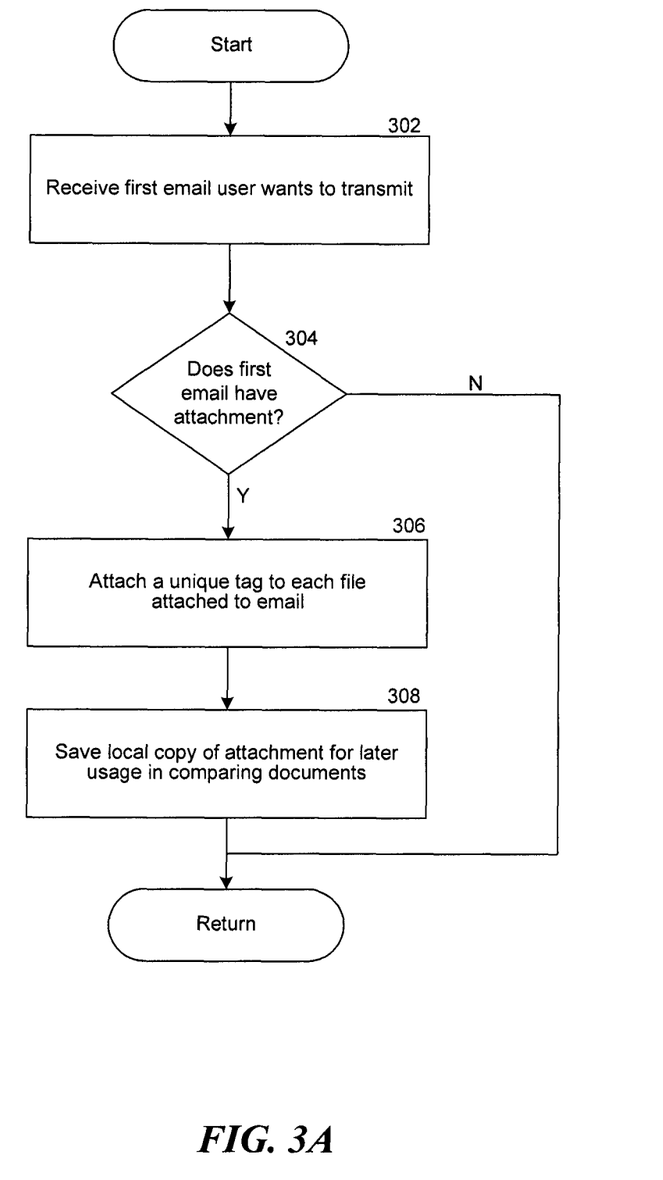
FIGS. 3A-3B are flow diagrams depicting process flows of the change service functionalities.

FIG. 3A is a flow diagram illustrating an operation of the receiving module 1302 of the change service 136. In embodiments, as indicated in block 302, the receiving module 1302 receives a first email that a user wishes to transmit to another person. At block 304, the receiving module 1302 verifies whether the first email has any files attached to it. If the receiving module 1302 detects the presence of at least one file, the process branches to block 306, where the receiving module uniquely tags each file attached to the first email. Otherwise, if no file is attached to the first email, the process proceeds to the return step from block 304. Subsequent to tagging the files at block 304, the process proceeds to block 308, where the receiving module optionally stores a copy of the tagged files for later usage in the matching/comparison operations. It is emphasized that the above process and all subsequent process descriptions merely illustrate exemplary embodiments of the functionalities of the compare service 136 and that variations of the process steps (in terms of varied sequences or omission of the indicated steps) are equally viable alternatives.

Figure 3B:
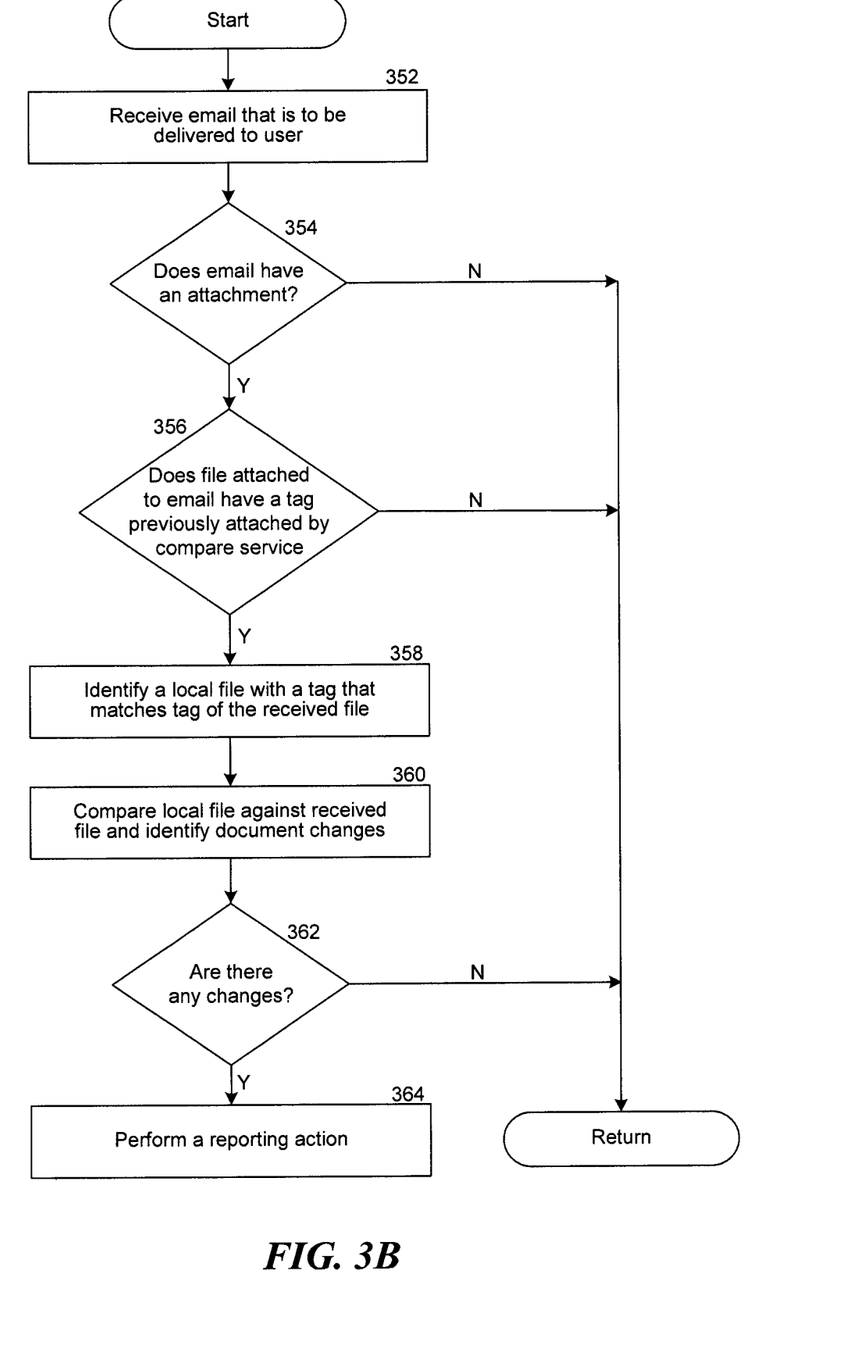

FIG. 3B is a flow diagram illustrating a process for monitoring emails received by an email application. As depicted, at block 352, the compare service 136 receives or intercepts an email that is intended to be delivered to the user. At block 354, the compare service 136 determines whether the email has one or more file attachments. If files are identified, the process shifts to block 356, where the compare service 356 further determines whether the files have tags that are unique to the compare service. If the process determines that the tags are indeed unique to the compare service, the process shifts to block 358, where the compare service 136 identifies a file (that was previously transmitted in an email sent by the user) that matches the received file's tag. Subsequently, at block 360, the process compares contents of the received file with contents of the file identified at block 358. Block 362 determines whether any changes are detected. If changes are detected in the contents of the files, the process shifts to block 362, where the compare service 136 performs a suitable reporting action (e.g., provide a visual indicator in relation to the email indicator, provide an indicator of a difference value representing percentage amount of difference in contents of the files, etc.).

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the applicant reserves the right to add additional claims after filing the application to pursue such additional claim forms for other aspects of the invention.

I claim:

1. A method for tracking changes in documents exchanged over email applications, the method comprising:
    identifying, by a processor implementing a compare service, a first file attached to a first email received via an email application;
    comparing, by the compare service, a first identifier associated with the first file to identifiers associated with one or more files previously transmitted via the email application;
    identifying a second file from the one or more previously transmitted files that corresponds to the first identifier;
    comparing the first file and the second file to identify one or more changes made to contents of the first file in relation to the second file;
    upon identifying at least one change in the first file, displaying a visual indicator in the email application in relation to an indicator of the first email;
    prior to transmitting a given email via the email application, identifying, by the compare service, presence of a given file attachment to the given email;
    upon identifying the given file attachment, attaching, by the compare service, a given tag to the given file attachment prior to the email application transmitting the given email;
    maintaining, by the compare service, a compare database, wherein the compare database includes one or more tags identifying corresponding files transmitted via the email application; and
    maintaining, by the compare service, a copy of the corresponding files for use in later comparison steps.

2. The method of claim 1, wherein the compare database is local in relation to the email application.

3. The method of claim 1, wherein the compare database is located in a remote server in relation to the email application.

4. The method of claim 1, wherein the step of comparing the first file and the second file includes one or more of:
    comparing a change in formatting;
    comparing a change in textual data;
    comparing a change in image data; or
    comparing a change in presentation-related information when the first file and the second file are slide decks.

5. The method of claim 1, further comprising:
    generating a report file, wherein the report file is a redline representation of the comparison of first and second files; and
    including the report file as an attachment to the first email.

6. The method of claim 1, further comprising:
    generating a report file, wherein the report file is a redline representation of the comparison of the first and second files; and
    embedding contents of the report file directly within a body of the first email.

7. A method for monitoring attachments in an email application, the method comprising:
    identifying, by a processor implementing a compare service, a first file attached to a first email that a user intends to transmit via an email application;
    assigning, by the compare service, a first tag to the first file prior to the email application transmitting the first email;
    identifying a second file attached to a second email that is received by the email application;
    comparing a second tag associated with the second email and the first tag associated with the first file;
    comparing the second tag with the first tag;
    upon identifying that the second tag matches the first tag, comparing contents of the first file and the second file to identify one or more changes made to contents of the second file in relation to the first file;
    upon identifying at least one change in the second file, displaying a visual indicator in the email application in relation to an indicator of the second email to denote the at least one change;
    maintaining, by the compare service, a compare database, wherein the compare database includes one or more tags identifying corresponding files transmitted via the email application; and
    maintaining, by the compare service, a copy of the corresponding files for use in later comparison steps.

8. The method of claim 7, wherein the compare database is local in relation to the email application.

9. The method of claim 7, wherein the compare database is located in a remote server in relation to the email application.

10. The method of claim 7, wherein the step of comparing the first file and the second file includes one or more of:
    comparing a change in formatting;
    comparing a change in textual data;
    comparing a change in image data; or
    comparing a change in presentation-related information when the first file and the second file are slide decks.

11. The method of claim 7, further comprising:
    generating a report file, wherein the report file is a redline representation of the comparison of the first and second files; and
    including the report file as an attachment to the first email.

12. The method of claim 7, further comprising:
    generating a report file, wherein the report file is a redline representation of the comparison of the first and second files; and
    embedding contents of the report file directly within a body of the first email.

13. A system for tracking changes in documents exchanged over email applications, the system comprising:
    a receiving module configured to identify a first file attached to a first email received via an email application, and to identify, prior to transmitting a given email via the email application, presence of a given file attachment to the given email;

a matching module configured to:
compare a first identifier associated with the first file to identifiers associated with one or more files previously transmitted via the email application; and
identify a second file from the one or more previously transmitted files that corresponds to the first identifier;

a comparing module configured to compare the first file and the second file to identify one or more changes made to contents of the first file in relation to the second file; to include a compare database stored on a memory, wherein the compare database includes one or more tags identifying corresponding files transmitted via the email application; and to maintain a copy of the corresponding files for use in later comparison steps;

a reporting module configured to display, upon identifying at least one change in the first file, a visual indicator in the email application in relation to an indicator of the first email; and a tagging module configured to attach, upon identifying the given file attachment, a given tag to the given file attachment prior to the email application transmitting the given email.

14. The system of claim 13, wherein the compare database is local in relation to the email application.

15. The system of claim 13, wherein the compare database is located in a remote server in relation to the email application.

16. The system of claim 13, wherein the step of comparing the first file and the second file, as executed by the comparing module, includes one or more of:
comparing a change in formatting;
comparing a change in textual data;
comparing a change in image data; or
comparing a change in presentation-related information when the first file and the second file are slide decks.

17. The system of claim 13, wherein the reporting module is further configured to:
generate a report file, wherein the report file is a redline representation of the comparison of first and second files; and
include the report file as an attachment to the first email.

18. The system of claim 13, wherein the reporting module is further configured to:
generate a report file, wherein the report file is a redline representation of the comparison of the first and second files; and
embed contents of the report file directly within a body of the first email.

19. A system for monitoring attachments in an email application, the system comprising:
a processor;
a memory configured to store a set of instructions, which when executed by the processor cause the system to perform a method, the method including:
identifying, by a processor implementing a compare service, a first file attached to a first email that a user intends to transmit via an email application;
assigning, by the compare service, a first tag to the first file prior to the email application transmitting the first email;
identifying a second file attached to a second email that is received by the email application;
comparing a second tag associated with the second email and the first tag associated with the first file;
comparing the second tag with the first tag;
upon identifying that the second tag matches the first tag, comparing contents of the first file and the second file to identify one or more changes made to contents of the second file in relation to the first file;
upon identifying at least one change in the second file, displaying a visual indicator in the email application in relation to an indicator of the second email to denote the at least one change;
maintaining, by the compare service, a compare database, wherein the compare database includes one or more tags identifying corresponding files transmitted via the email application; and
maintaining, by the compare service, a copy of the corresponding files for use in later comparison steps.

20. The system of claim 19, wherein the compare database is local in relation to the email application.

21. The system of claim 19, wherein the compare database is located in a remote server in relation to the email application.

22. The system of claim 19, wherein the step of comparing the first file and the second file includes one or more of:
comparing a change in formatting;
comparing a change in textual data;
comparing a change in image data; or
comparing a change in presentation-related information when the first file and the second file are slide decks.

23. The system of claim 19, wherein the method further comprises:
generating a report file, wherein the report file is a redline representation of the comparison of the first and second files; and
including the report file as an attachment to the first email.

24. The system of claim 19, wherein the method further comprises:
generating a report file, wherein the report file is a redline representation of the comparison of the first and second files; and
embedding contents of the report file directly within a body of the first email.

* * * * *